(12) United States Patent
Münzenberg et al.

(10) Patent No.: US 8,461,213 B2
(45) Date of Patent: Jun. 11, 2013

(54) THICKENERS BASED ON POLYURETHANE

(75) Inventors: Cindy Münzenberg, Duesseldorf (DE); Oliver Pietsch, Mülheim (DE)

(73) Assignee: Cognis IP Management GmbH, Duesseldorf (DE)

(*) Notice: Subject to any disclaimer, the term of this patent is extended or adjusted under 35 U.S.C. 154(b) by 104 days.

(21) Appl. No.: 13/035,241

(22) Filed: Feb. 25, 2011

(65) Prior Publication Data

US 2011/0313053 A1   Dec. 22, 2011

(30) Foreign Application Priority Data

Feb. 25, 2010   (EP) .................................... 10001928

(51) Int. Cl.
*A61K 47/30*   (2006.01)

(52) U.S. Cl.
USPC ........................................ 514/772.3

(58) Field of Classification Search
USPC ........................................ 514/772.3
See application file for complete search history.

(56) References Cited

U.S. PATENT DOCUMENTS

| | | | |
|---|---|---|---|
| 4,079,028 A | 3/1978 | Emmons et al. | 260/29.6 |
| 5,109,061 A * | 4/1992 | Speranza et al. | 524/710 |
| 2005/0187342 A1 * | 8/2005 | Schieferstein et al. | 524/591 |

FOREIGN PATENT DOCUMENTS

| | | |
|---|---|---|
| EP | 1164169 | 12/2001 |
| WO | 97/21743 | 6/1997 |
| WO | 2006/002813 | 1/2006 |

* cited by examiner

*Primary Examiner* — Rei-tsang Shiao
(74) *Attorney, Agent, or Firm* — Servilla Whitney LLC

(57) ABSTRACT

Thickeners, which are based on an aqueous preparation of nonionic water-dispersible or water-soluble polyurethanes, it being possible to produce these polyurethanes by reacting
(a) one or more hydrophilic polyols (a) which contain, per molecule, at least two OH groups and at least two functional groups which are selected from the functions —O— (ether groups) and —COO— (ester groups), where the molecular weight of these hydrophilic compounds is at least 300,
(b) one or more compounds of the formula (I),

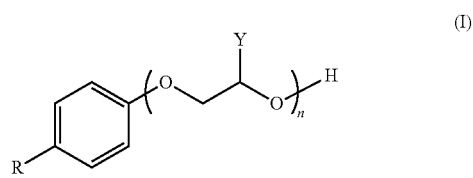

in which R is a $CH_3$—$CH(CH_3)$— $(CH_2$—$CH(CH_3))_2$— group or a $C_{15}H_{31-m}$ group (where m=0, 2, 4 or 6), Y is hydrogen or a methyl group and n is a number in the range from 0 to 10, and
(c) one or more at least difunctional isocyanates, in which the compounds a), b) and c) are reacted with one another in the equivalent ratios $OH_{a)}:OH_{b)}:NCO_{c)}$ of $1:(1+x):2(1+y)$, with the provisos that the following conditions apply:
x is a number in the range from 0.05 to 1.2,
y is a number in the range from (0.2 to 1.05)x, and
equivalent ratio $NCO_{c)} > (OH_{a)} + OH_{b)})$
are characterized by excellent thickening effect, in particular for aqueous dispersions.

8 Claims, No Drawings

THICKENERS BASED ON POLYURETHANE

CROSS-REFERENCE TO RELATED APPLICATIONS

This application claims priority to European Patent Application EP10001928.0, filed on Feb. 25, 2010, which is incorporated herein by reference in its entirety.

FIELD OF THE INVENTION

The invention relates to thickeners based on an aqueous preparation of nonionic water-dispersible or soluble polyurethanes with a specific structure.

PRIOR ART

Polyurethane solutions or dispersions in water-dilutable aqueous or predominantly aqueous phase are referred to by the person skilled in the art as HEUR thickeners (the acronym HEUR is derived from "nonionic hydrophobically modified ethylene oxide urethane block copolymer") and has been used for a relatively long time in highly diverse fields of application for thickening water-based emulsion paints.

The thickeners of the HEUR type described as early as the end of the 1970s in U.S. Pat. No. 4,079,028 are composed of linear and/or branched polyethylene glycol blocks and hydrophobic segments which are generally linked together via urethane groups (when using amines instead of alcohols, urea groups result).

The principle of action for the thickening effect of the HEUR thickeners is assumed to be that the polyethylene glycol segments ensure the water compatibility and the hydrophobic segments construct a viscosity-imparting three-dimensional molecular association via an association with one another and also with dispersed binder particles of the emulsion paint to be thickened therein.

Preferred hydrophobic building blocks in standard commercial HEUR thickeners are relatively long-chain, generally monofunctional alcohols, such as, for example, n-octanol, n-dodecanol, isotridecyl alcohol, isononylphenol or methyl ricinoleate. These alcohols are used predominantly as they are, but also in the form of their addition products with a few equivalents of ethylene oxide. The polyfunctional isocyanate building blocks used predominantly in standard commercial HEUR thickeners are generally difunctional. For example, methylenebis(4-cyclohexyl) diisocyanate, m/p-tetramethylenexylylene diisocyanate, hexamethylene diisocyanate, 2,4-tolylene diisocyanate, trimethylhexamethylene diisocyanate or 4/2,4'-diphenylmethane diisocyanate are used. The polyethylene glycol building blocks used in standard commercial HEUR thickeners are generally likewise difunctional and have molecular weights in the region of a few thousand daltons, for example 4500 or 10 000 daltons.

The use ratios of the individual building blocks of HEUR thickeners—whether branched or unbranched polyethylene glycols, mono- or polyfunctional hydrophobic alcohols, preethoxylated mono- or polyfunctional hydrophobic alcohols, di- or polyfunctional short-chain alcohols used as chain extenders—are generally selected such that in each case one hydrophobic alcohol is still available to each one via an ethylene glycol segment end reactive hydroxyl groups.

The hydroxyl-terminated synthesis building blocks of HEUR thickeners are joined together through reaction with di- or polyfunctional isocyanates, where the equivalent use ratios of the isocyanate groups and of the "H-acidic" groups (generally OH groups, although $NH_2$ groups are also possible) to be brought together for the addition reaction are selected such that at least slightly less than one isocyanate group equivalent is facing each "H-acidic" group equivalent, thus as a rule each OH group. In other words: the OH:NCO equivalent ratio is generally adjusted to a value of at least 1:1, where ideally 1:1 is aimed for or the OH groups predominate compared to the NCO groups by 5-10% (which corresponds to an equivalent ratio of OH:NCO in the range from 1.05:1 to 1.1:1) in order to ensure that the end product (the HEUR thickener) contains no free NCO groups, which are undesired on the one hand for toxicological reasons, and on the other hand because, upon subsequent use in formulations to be thickened, they can enter into undesired secondary reactions with formulation constituents. This basic principle that namely during the production of HEUR thickeners the OH groups of the polyethylene glycol building blocks and hydrophobic alcohol building blocks predominate slightly by ca. 5-10% compared to the NCO groups of the isocyanate building blocks is already part of the teaching of the aforementioned U.S. Pat. No. 4,079,028 (cf. therein column 3, line 17ff).

WO-A-2006/002813 describes thickeners which are based on an aqueous preparation of nonionic, water-dispersible or water-soluble polyurethanes, it being possible to produce these polyurethanes by reacting (a) one or more hydrophilic polyols (a) which contain, per molecule, at least two OH groups and at least two functional groups which are selected from the functions —O— (ether groups) and —COO— (ester groups), where the molecular weight of these hydrophilic compounds is at least 300, (b) one or more hydrophobic compounds with at least one Zerewitinoff-active hydrogen atom per molecule, where the molecular weight of these hydrophobic compounds is in the range from 100 to 500 and where, per molecule of these hydrophobic compounds, at least one linear or branched, saturated or unsaturated alkyl chain with at least five successive carbon atoms is present which is not linked to heteroatoms, and (c) one or more, at least difunctional isocyanates, where the compounds a), b) and c) are reacted with one another in the equivalent ratios $OH_{(a)}:ZH_{(b)}:NCO_{(c)}$ of 1:(1+x):2(1+y), with the provisos that the following conditions apply: x is a number in the range from 0.05 to 1.2 and y is a number in the range from (0.2 to 1.05)x.

DESCRIPTION OF THE INVENTION

It was an object of the invention to provide thickeners based on polyurethane which, compared with the polyurethane thickeners from the prior art, were achieved an increased viscosity of the thickened product coupled with a comparatively lower intrinsic viscosity of the thickeners in their formulation form in the same amount. Moreover, it should be possible to prepare the thickeners if desired without using volatile organic solvents. In particular, the thickeners should have an improved thickening effect in their formulation form for the same amount in the range of low shear rates (low-shear range $\leq 10$ $s^{-1}$) coupled with simultaneously low to moderate viscosity in the mid- and high-shear range, as the result of which better spreadability with a lower application of force is possible as a desired technical effect.

The present invention provides thickeners which are based on an aqueous preparation of nonionic water-dispersible or water-soluble polyurethanes, it being possible to produce these polyurethanes by reacting
(a) one or more hydrophilic polyols (a) which contain, per molecule, at least two OH groups and at least two functional groups which are selected from the functions —O—

(ether groups) and —COO— (ester groups), where the molecular weight of these hydrophilic compounds is at least 300,
(b) one or more compounds of the formula (I)

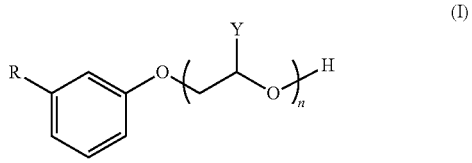

in which R is a $CH_3$—$CH(CH_3)$—$(CH_2$—$CH(CH_3))_2$— group or a $C_{15}H_{31-m}$ group (where m=0, 2, 4 or 6), Y is hydrogen or a methyl group and n is a number in the range from 0 to 10, and
(c) one or more at least difunctional isocyanates, in which the compounds a), b) and c) are reacted with one another in the equivalent ratios $OH_{a)}$:$OH_{b)}$:$NCO_{c)}$ of 1:(1+x):2(1+y), with the provisos that the following conditions apply:
x is a number in the range from 0.05 to 1.2,
y is a number in the range from $(0.2 \text{ to } 1.05)_x$, and
equivalent ratio $NCO_{c)} > (OH_{a)} + OH_{b)})$.

The thickening effect of the inventive thickeners is significantly better than the thickening effect of the compounds disclosed in the aforementioned WO-A-2006/002813. This applies in particular to those in the low-shear range ($<10 \text{ s}^{-1}$).

The expression $OH_{a)}$ refers to the primary (terminal) OH groups of the compounds a). The expression $OH_{b)}$ refers to the OH groups of the compounds b) which are reactive towards NCO groups. The expression $NCO_{c)}$ refers to the isocyanate groups of the compounds c).

Within the context of the present invention, the equivalents of the compounds a) are OH equivalents, the compounds b) are OH equivalents and the compounds c) are NCO equivalents.

Although the concept of equivalent is familiar to the person skilled in the art in the field of polyurethane chemistry under discussion here, for the sake of clarity, it will be described below what is meant by this.

The expression equivalents is to be understood in the customary sense and focuses on the available reactive groups of molecules. Thus, for example, 1 mol of a monoalcohol contains 1 mol of OH groups; 1 mol of a diol contains 2 mol of OH groups, 1 mol of a triol contains 3 mol of OH groups, etc. Quite analogously, 1 mol of a diisocyanate (NCO functionality=2) contains 2 mol of NCO groups, 1 mol of a polyisocyanate mixture with an (average) functionality of 2.3 contains on average 2.3 mol of NCO groups, etc. If, for example, the wish is to react alcohols and isocyanates together such that the compounds used should be in certain ratios, based on the OH or NCO groups, respectively, then it is recommended to use the ratios of the reactive groups instead of weight ratios or molar ratios. This OH:NCO ratio is referred to as the equivalent ratio.

Expressed in general terms, the equivalent ratio is the numerical ratio of defined reactive groups in the reactants used.

For illustrative purposes, it may additionally be explained by means of a practical example how an equivalent ratio is ascertained in a simple manner. If, for example, within the context of the teaching according to the invention,
1 mol of a polyethylene glycol (PEG, OH functionality=2) with two OH groups per molecule is reacted with 4 mol of a hydrophobic alcohol (I) (OH functionality=1) with one OH group per molecule and
4 mol of a diisocyanate (NCO functionality=2) to give the polyurethane, then
the PEG used contains 2 mol of OH groups,
the hydrophobic alcohol (I) used contains 4 mol of OH groups and
the diisocyanate used contains 8 mol of NCO groups.

The numerical ratio of the OH groups of the polyethylene glycol to the OH groups of the hydrophobic alcohol (I) to the NCO groups of the diisocyanate is therefore 2:4:8 or 1:2:4.

Or vice versa: if it is the wish to react the components just mentioned (PEG, hydrophobic alcohol (I) and diisocyanate) in an equivalent ratio of 1:3:3, then polyethylene glycol, hydrophobic alcohol (I) and diisocyanate have to be used in a molar ratio of 0.5:3:1.5 or 1:6:3.

Preferably, x is a number in the range from 0.2 to 1.0 and in particular in the range from 0.5 to 1.0.

For the sake of clarity and unambiguity, it may be expressly determined that y arises through multiplication. The expression stated for y, namely "(0.2 to 1.05)x" therefore means that x—for which a number is to be used from the range stated for x—has to be multiplied by a number from the range 0.2 to 1.05.

Preferably, y is a number in the range from (0.4 to 1.0)x and in particular in the range from (0.6 to 1.0)x.

In one preferred embodiment, x is a number in the range from 0.2 to 1.0 and y is a number in the range from (0.4 to 1.0)x.

In a further preferred embodiment, x is a number in the range from 0.5 to 1.0 and y is a number in the range from (0.4 to 1.0)x.

The Components (a)

The hydrophilic polyols (a) contain per definition per molecule at least two OH groups and at least two functional groups which are selected from the functions —O— (ether groups) and —COO— (ester groups), where the molecular weight of these hydrophilic compounds is at least 300 and preferably at least 1000. The component (a) is therefore the hydrophilic molecular building block of the polyurethanes according to the invention of the HEUR type. Reference may be expressly made to the fact that the compounds (a) differ in principle from those compounds (b) which are not hydrophilic but hydrophobic.

Of suitability as compounds (a) are, for example, the polymerization products of ethylene oxide, the mixed or graft polymerization products thereof and also the by condensation of polyhydric alcohols or mixture thereof and the polyethers obtained by ethoxylation of polyhydric alcohols, amides, polyamides and aminoalcohols. Examples of suitable compounds (a) are for example polyethylene glycols, addition products of ethylene oxide onto trimethylolpropane, EO-PO block copolymers, OH-terminated polyesters, such as, for example, those of the type of polyfunctional polycaprolactones.

Preferred compounds (a) are polyetherpolyols. These are those hydrophilic polyols (a) which contain at least two OH groups and at least two —O— functions (ether groups) per molecule. These polyetherpolyols are generally so hydrophilic that they are water-soluble. Of suitability for producing the polyurethanes according to the invention are preferably those polyetherpolyols which contain at least predominantly polyethylene glycol. Particularly good results are achieved if these polyethylene glycols have an average content of alkoxy units in the range from 20 to 400. As compounds (a), preference is given to diols of the general formula HO—(CH$_2$—CH$_2$—O)$_x$—H, where x can assume the values 30 to 300. These are polyethylene glycols which are condensation products of ethylene oxide with ethylene glycol or water. Preferably, the molecular weight of these polyethylene glycols is adjusted to values in the range from 2000 to 20 000. Polyethylene glycols with a molecular weight in the range from 4000 to 10 000 are particularly preferred as compounds (a).

The Component (b)

Component (b) is compounds of the formula (I)

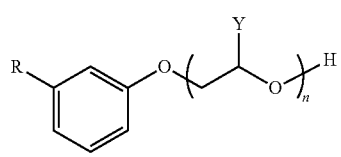
(I)

in which R is a CH$_3$—CH(CH$_3$)—(CH$_2$—CH(CH$_3$))$_2$— group or a C$_{15}$H$_{31-m}$ group (where m=0, 2, 4 or 6), Y is hydrogen or a methyl group and n is a number in the range from 0 to 10.

The compounds (I) contain a structural element —(CH$_2$—CHY—O)$_n$—. It may be established that the formula style used is intended to express that this structural element is derived from ethylene oxide (EO) or propylene oxide (PO), namely insofar as—logically for the case where the index n is not zero—this structural element results synthetically from an addition of EO or PO or ethylene glycol or propylene glycol (where n=1) or polyaddition of EO and/or PO or polyethylene glycol or polypropylene glycol or corresponding mixed EO-PO copolymers (where n≧2). It may also be expressly established that this structural element can be composed both exclusively of EO building blocks and also exclusively of PO building blocks, and can also contain EO and PO building blocks in mixed form, blockwise or in random distribution. The formula representation of said structural element used is therefore an abbreviated form of said options which are self-evident to the person skilled in the art.

Thus, for example, Y=H and n=5 means that the corresponding structural element contains five EO units linked together, which corresponds to a group —(O—CH$_2$—CH$_2$—)$_5$—; by contrast, Y=CH$_3$ and n=5 means that the structural element contains five PO units linked together, which corresponds to a group —(O—CH$_2$—CH(CH$_3$))$_5$—, where—as is known to the person skilled in the art—the orientation of the methyl group within the structural element can be realized for each PO building block in two different ways, namely as —(O—CH$_2$—CH(CH$_3$))— or —(O—CH(CH$_3$)—CH$_2$)—.

In one embodiment, those compounds (I) are used in which R is a group CH$_3$—CH(CH$_3$)—(CH$_2$—CH(CH$_3$))$_2$—, Y is hydrogen or a methyl group and n is the number zero.

In one embodiment, those compounds (I) are used in which R is a group CH$_3$—CH(CH$_3$)—(CH$_2$—CH(CH$_3$))$_2$—, Y is hydrogen or a methyl group and n is a number in the range from 1 to 10.

In one embodiment, those compounds (I) are used in which R is a group C$_{15}$H$_{31-m}$ (where m=0, 2, 4 or 6), Y is hydrogen or a methyl group and n is the number 0; these compounds (I) are cardanols.

In one embodiment, those compounds (I) are used in which R is a group C$_{15}$H$_{31-m}$ (where m=0, 2, 4 or 6), Y is hydrogen or a methyl group and n is a number in the range from 1 to 10; these compounds (I) are cardanol alkoxylates.

The compounds (I) can be used individually or in the form of a mixture.

The Components (c)

Suitable at least difunctional isocyanates (c) are all polyfunctional aromatic, alicyclic and aliphatic isocyanates. Preferably, the suitable polyfunctional isocyanates comprise on average 2 to at most 4 NCO groups. Diisocyanates are preferred as compounds (c).

For example, suitable isocyanates which may be mentioned are 1,5-naphthalene diisocyanate, 4,4'-di-phenylmethane diisocyanate (MDI), hydrogenated MDI (H$_{12}$MDI), xylylene diisocyanate (XDI), tetramethylxylene diisocyanate (TMXDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate, the isomers of tolylene diisocyanate (TDI), optionally in a mixture, 1-methyl-2,4-diioscyanatocyclohexane, 1,6-di-isocyanato-2,2,4-trimethylhexane, 1,6-diisocyanato-2,4,4-trimethylhexane, 1-isocyanatomethyl-3-isocyanato-1,5,5-trimethylcyclohexane, chlorinated and brominated diisocyanates, phosphorus-containing diisocyanates, 4,4'-diisocyanatophenylperfluoroethane, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, bis-isocyanatoethyl phthalate, also polyisocyanates with reactive halogen atoms, such as 1-chloromethylphenyl 2,4-diisocyanate, 1-bromomethylphenyl 2,6-diisocyanate, 3,3-bischloromethyl ether 4,4'-diphenyldiisocyanate. Sulfur-containing polyisocyanates are obtained for example by reacting 2 mol of hexamethylene diisocyanate with 1 mol of thiodiglycol or dihydroxydihexyl sulfide. Further important diisocyanates are trimethylhexamethylene diisocyanate, 1,4-diisocyanatobutane, 1,2-diisocyanatododecane and dimer fatty acid diisocyanate. Worthy of interest are in part capped polyisocyanates which permit the formation of self-crosslinking polyurethanes, e.g. dimeric tolylene diisocyanate, or polyisocyanates partially reacted with, for example, phenols, tertiary butanol, phthalimide, caprolactam.

According to the invention, it is preferred that the isocyanates (c) used for producing the polyurethanes comprise at least predominantly isophorone diisocyanate (IPDI) and/or tetramethylxylene diisocyanate (TMXDI). Component (c) is preferably exclusively selected from the group isophorone diisocyanate (IPDI) and tetramethylxylene diisocyanate (TMXDI).

In one preferred embodiment, isocyanates with a functionality of 2 (difunctional isocyanates) are used.

In another embodiment, isocyanates with a functionality above 2 are used—proportionately or entirely—if the desire is to produce polyurethanes with a branched structure.

The Polyurethanes to be Used According to the Invention

The OH/OH/NCO ratio of the polyurethanes to be used according to the invention which must obligatorily contain the building blocks (a), (b) and (c) can in principle be varied over a wide range while maintaining the conditions presented above.

Thickener Concentrates

The invention further provides thickener concentrates comprising (A) water,
(B) nonionic water-dispersible or water-soluble polyurethanes which can be produced by reacting
  (a) one or more hydrophilic polyols (a) which contain, per molecule, at least two OH groups and at least two functional groups which are selected from the functions —O— (ether groups) and —COO— (ester groups), where the molecular weight of these hydrophilic compounds is at least 300,
  (b) one or more compounds of the formula (I)

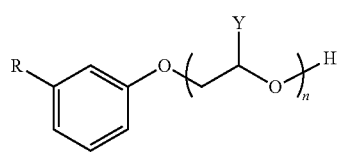

in which R is a $CH_3$—$CH(CH_3)$—$(CH_2$—$CH(CH_3))_2$— group or a $C_{15}H_{31-m}$ group (where m=0, 2, 4 or 6), Y is hydrogen or a methyl group and n is a number in the range from 0 to 10, and
  (c) one or more at least difunctional isocyanates,
in which the compounds a), b) and c) are reacted with one another in the equivalent ratios $OH_{a)}$:$OH_{b)}$:$NCO_{c)}$ of 1:(1+x):2(1+y).

with the provisos that the following conditions apply:
x is a number in the range from 0.05 to 1.2,
y is a number in the range from $(0.2$ to $1.05)_x$, and
equivalent ratio $NCO_{c)} > (OH_{a)} + OH_{b)})$ and
(C) optionally one or more organic solvents and/or nonionic surfactants of the type of the addition compounds of ethylene oxide and/or propylene oxide onto alcohols having 8 to 18 carbon atoms.

As regards preferred embodiments, that stated above is applicable with respect to compounds (B).

The solvents (C) are volatile organic solvents. Examples thereof considered are low molecular weight alcohols such as methanol, ethanol, n-propanol, isopropanol, n-butanol, isobutanol, sec-butanol, ethanediol, propanediol, butanediol, glycerol, trimethylolpropane.

Preferred nonionic surfactants of the type of the addition compounds of ethylene oxide and/or propylene oxide onto alcohols having 8-18 carbon atoms (C) are those with 2 to 4 mol of ethylene oxide per mol of alcohol. The carbon backbone of the alcohols here may be saturated or unsaturated, linear or branched. An example of a suitable compound (C) of this class which may be mentioned is for example Dehydrol O4 (commercial product from Cognis), an addition product of 4 mol of ethylene oxide per mol of octanol.

Furthermore, the invention relates to the use of the thickeners or thickener concentrates according to the invention for thickening aqueous systems, preferably aqueous dispersions, selected from the group consisting of aqueous automotive finishes and industrial coatings, printing and textile inks, pigment printing pastes, aqueous pharmaceutical formulations, cosmetic formulations or pharmaceutical-cosmetic formulations, crop protection formulations, filler and pigment dispersions, preparations of detergents, adhesives, waxes and polishes, and also for petroleum recovery, in particular for thickening aqueous colored renders and paints in dispersion form.

EXAMPLES

Chemicals Used and Abbreviations Used

PEG 8000: Pluriol E 8000 (BASF)
IPDI: Isophorone diisocyanate (IPDI, Degussa/Hüls)
Exxal 9 Isononanol (oxomethylated propene trimer; commercial product "Exxal 9" from Exxon Mobil Chemical)
Dehydrol O4 Addition product of 4 mol of ethylene oxide onto 1 mol of n-octanol (Cognis)
NeoCryl XK 98 Acrylic emulsion (DSM NeoResins)
Cardanol*8EO Addition product of 8 mol of ethylene oxide onto 1 mol of Cardanol
Nonylphenol*1.5 EO Addition product of 1.5 mol ethylene oxide onto 1 mol of nonylphenol
Demin. water Demineralized water

Polyurethane Preparation

Example 1

Inventive 198 g (24 mmol) of PEG 8000 (polyethylene glycol from BASF) were introduced as initial charge in the 1 l four-neck flask. It was evacuated twice and aerated with nitrogen. A vacuum was then applied and the mixture was heated to 100° C. At this temperature and under a reduced pressure of at least 10 mbar, water was removed over a period of 2 hours. The system was then aerated with nitrogen and, in the further course, the protective-gas atmosphere was maintained by a gentle stream of nitrogen. The mixture was stirred over the entire following reaction time using a stirrer speed of 120 rpm. Then, in succession, 40.9 g of Cardanol*8 EO (72 mmol) and 16.0 g of isophorone diisocyanate (72 mmol) were added. The reaction temperature was held at 110° C. during the addition and during the subsequent reaction time.

As soon as residual isocyanate could no longer be detected, the temperature was kept at 110° C. and 154.0 g of Dehydrol O4 were added. This mixture was stirred until homogeneous. Then, 364.2 g of demin. water were added with stirring.

After the product had cooled down, ca. 740 g of a viscous, cloudy, slightly yellowish polymer solution were isolated from the reaction vessel.

The dry residue (for its determination ca. 2 g of the polymer solution prepared as described were dried in a 10 cm aluminum dish at 105° C. for 1.5 h in a convection drying cabinet) was 51.1% by weight and the Brookfield viscosity was 8.9 Pas (Brookfield RVT viscometer/spindle 3/10 rpm/23° C.). The coating viscosity in the Epprecht viscometer was 140 Pas (spindle C).

Example 2

Inventive 198 g (24 mmol) of PEG 8000 (polyethylene glycol from BASF) were introduced as initial charge in the 1 l four-neck flask. It was evacuated twice and aerated with nitrogen. A vacuum was then applied and the mixture was heated to 100° C. At this temperature and under a reduced pressure of at least 10 mbar, water was removed over a period of 2 hours. The system was then aerated with nitrogen and, in the further course, the protective-gas atmosphere was maintained by a gentle stream of nitrogen. The mixture was stirred over the entire following reaction time using a stirrer speed of 120 rpm. Then, in succession, 20.9 g of Nonylphenol*1.5 EO (72 mmol) and 16.0 g of isophorone diisocyanate (72 mmol) were added. The reaction temperature was held at 110° C. during the addition and during the subsequent reaction time.

As soon as residual isocyanate could no longer be detected, the temperature was kept at 110° C. and 141.5 g of Dehydrol O4 were added. This mixture was stirred until homogeneous. Then, 334.6 g of demin. water were added with stirring.

After the product had cooled down, ca. 707.4 g of a viscous, cloudy, slightly yellowish polymer solution were isolated from the reaction vessel.

The dry residue (for its determination ca. 2 g of the polymer solution prepared as described were dried in a 10 cm aluminum dish at 105° C. for 1.5 h in a convection drying cabinet) was 50.8% by weight and the Brookfield viscosity was 6.52 Pas (Brookfield RVT viscometer/spindle 3/10 rpm/23° C.). The coating viscosity in the Epprecht viscometer was 160 Pas (spindle C).

Example 3

Comparative 185.7 g (24 mmol) of PEG 8000 (polyethylene glycol from BASF) were introduced as initial charge in the 1 l four-neck flask. It was evacuated twice and aerated with nitrogen. A vacuum was then applied and the mixture was heated to 100° C. At this temperature and under a reduced pressure of at least 10 mbar, water was removed over a period of 2 hours. The system was then aerated with nitrogen and, in the further course, the protective-gas atmosphere was maintained by a gentle stream of nitrogen. The mixture was stirred over the entire following reaction time using a stirrer speed of 120 rpm. Then, in succession, 10.6 g (72 mmol) of Exxal 9 (isononanol) and 16.0 g of isophorone diisocyanate (72 mmol) were added. The reaction temperature was held at 110° C. during the addition and during the subsequent reaction time.

As soon as residual isocyanate could no longer be detected, the temperature was kept at 110° C. and 123.3 g of Dehydrol O4 were added. This mixture was stirred until homogeneous. Then, 296.2 g of demin. water were added with stirring. After the product had cooled down, ca. 622.3 g of a viscous, cloudy, slightly yellowish polymer solution were isolated from the reaction vessel.

The dry residue (for its determination ca. 2 g of the polymer solution prepared as described above were dried in a 10 cm aluminum dish at 105° C. for 1.5 h in a convection drying cabinet) was 50.4% by weight and the Brookfield viscosity was 4.85 Pas (Brookfield RVT viscometer/spindle 3/10 rpm/23° C.). The coating viscosity in the Epprecht viscometer was 190 Pas (spindle C).

Determination of the Dispersion Thickening 0.2% of the respective polymeric active ingredient according to the above examples (based on and calculated on the basis of active substance without Dehydrol O4) were homogenized with 0.41 g of a mixture of 31.4% by weight of propanediol and 68.6% by weight of water. 20 g of the aqueous polyacrylate dispersion Neocryl XK 90 (45% solids content; Neo Resins) were then added and the mixture was stirred until homogeneous using a wooden spatula for ca. two minutes. After a standing time of at least 20 hours, stirring was again carefully carried out using a wooden spatula. A Brookfield cone-plate viscometer Haake RC20-CPS-P with cone C50-1 was used to measure the viscosity. The results can be found in table 1.

TABLE 1

| | Dispersion viscosities | | |
|---|---|---|---|
| D [1/s] | Example 1 (invention) | Example 2 (invention) | Example 3 (comparison) |
| 0.1 | 321.8 | 69.5 | — |
| 0.5 | 237.0 | 64.2 | — |
| 1.0 | 186.0 | 57.2 | 2.1 |
| 2.0 | 142.6 | 49.6 | 2.6 |
| 5.0 | 78.6 | 38.2 | 2.7 |
| 10.0 | 48.1 | 30.1 | 2.6 |
| 50.0 | 11.6 | 15.0 | 1.9 |
| 100.0 | 5.2 | 9.8 | 1.6 |
| 300.0 | 1.5 | 3.2 | 1.1 |
| 500.0 | 0.7 | 1.1 | 0.9 |
| 4800.0 | 0.1 | 0.1 | — |

The "—" in the "Example 3" column in table 1 means that no measurement was possible.
The data for the dispersion viscosities in table 1 are in [mPas].
The abbreviation "D" in the first column of table 1 means shear rate.

The "-" in the "Example 3" column in table 1 means that no measurement was possible. The data for the dispersion viscosities in table 1 are in [mPas]. The abbreviation "D" in the first column of table 1 means shear rate.

SUMMARY

It is clearly evident from table 1 that a considerably improved thickening effectiveness is achieved overall in the low-shear range with the thickeners according to the invention (examples 1 and 2) than with a thickener according to the prior art (example 3).

What is claimed is:

1. A thickener comprising an aqueous preparation of a nonionic water-dispersible or water-soluble polyurethane, prepared by the process comprising the step of reacting a mixture comprising:
(a) one or more hydrophilic polyols which contain, per molecule, at least two OH groups and at least two functional groups selected from the group consisting of —O— (ether groups) and —COO— (ester groups), wherein the molecular weight of these hydrophilic compounds is at least 300,
(b) one or more compounds of the formula (I)

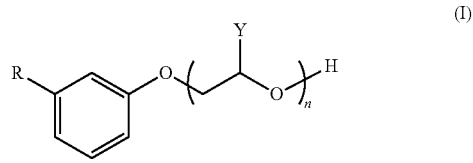

(I)

wherein R is a $C_{15}H_{31}$, group, and wherein m has a value of 0, 2, 4 or 6, Y is hydrogen or a methyl group and n is a number in the range from 0 to 10, and
(c) one or more difunctional isocyanates,
wherein the compounds (a), (b) and (c) are reacted with one another in the equivalent ratios $OH_{(a)}:OH_{(b)}:NCO_{(c)}$ of $1:(1+x):2(1+y)$, and wherein:
x is a number in the range from 0.05 to 1.2,
y is a number in the range from $(0.2$ to $1.05)_x$, and
equivalent ratio $NCO_{(c)}>(OH_{(a)}+OH_{(b)})$.

2. The thickener of claim 1, wherein component (a) is selected from the group consisting of polyethylene glycols with a molecular weight having a range of about 2000 to about 20 000.

3. The thickener of claim 1, wherein component (c) is selected from the group consisting of isophorone diisocyanate and tetramethylxylene diisocyanate.

4. A thickener concentrate comprising:
water,
a nonionic water-dispersible or water-soluble polyurethane of claim 1, and
optionally, one or more organic solvents and/or nonionic surfactants of the type of addition compounds of ethylene oxide and/or propylene oxide onto alcohols having 8 to 18 carbon atoms.

5. A method of thickening emulsion paints, the method comprising incorporating the thickener of claim 1 into a paint emulsion.

6. A method of thickening aqueous dispersions, the method comprising incorporating the thickener of claim 1 into an aqueous dispersion.

7. The method of claim 6, wherein the aqueous dispersion is a cosmetic preparation.

8. The thickener concentrate of claim 4 further comprising one or more organic solvents and/or nonionic surfactants of the type of addition compounds of ethylene oxide and/or propylene oxide onto alcohols having 8 to 18 carbon atoms.

* * * * *

UNITED STATES PATENT AND TRADEMARK OFFICE
CERTIFICATE OF CORRECTION

PATENT NO.        : 8,461,213 B2
APPLICATION NO.   : 13/035241
DATED             : June 11, 2013
INVENTOR(S)       : Cindy Munzenberg et al.

It is certified that error appears in the above-identified patent and that said Letters Patent is hereby corrected as shown below:

In the Claims:

Claim 1, column 10, line 58, $C_{15}H_{31}$ - should read - $C_{15}H_{31-m}$

Signed and Sealed this
Third Day of September, 2013

Teresa Stanek Rea
*Acting Director of the United States Patent and Trademark Office*